Patented Oct. 30, 1934

1,978,539

UNITED STATES PATENT OFFICE 1,978,539

BASIC ALCOHOL

Joseph Klarer, Fritz Mietzsch, and Hans Hahl, Elberfeld, Germany, assignors to Winthrop Chemical Company, Inc., New York, N. Y., a corporation of New York No Drawing. Application March 1, 1929, Serial No. 343,845. In Germany March 2, 1928

12 Claims. (Cl. 260—128.5)

The present invention relates to basic alcohols of the probable general formula:

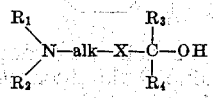

wherein $R_1$ and $R_2$ stand for hydrogen or alkyl groups, "alk" stands for an alkylene residue, X stands for one of the groups —NH—$C_6H_4$—, —N(alkyl)—$C_6H_4$— or —O—$C_6H_4$— (the nitrogen or oxygen atom being connected with the alkylene residue), $R_3$ stands for hydrogen, an alkyl, phenyl-or alkoxyphenyl residue and $R_4$ stands for an alkyl, phenyl- or alkoxyphenyl-residue.

Our new compounds are obtainable by reacting upon a compound of the general formula

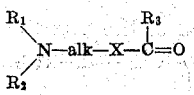

wherein $R_1$ and $R_2$ stand for hydrogen or alkyl groups, alk means an alkylene residue, X stands for — NH — $C_6H_4$ —, — N(alkyl) — $C_6H_4$ — or —O—$C_6H_4$— (the nitrogen or oxygen atom being connected with the alkylene residue) and $R_3$ stands for hydrogen, an alkyl-, phenyl-, or alkoxyphenyl residue with an equimolecular quantity of a Grignard compound of the general formula Hal.$MgR_4$ wherein Hal. stands for a halogen atom and $R_4$ stands for an alkyl, phenyl- or alkoxyphenyl residue. The Grignard compound used is obtainable according to the usual methods by treating a compound of the general formula Hal.$R_4$ (Hal. and $R_4$ meaning the same as in the above identified Grignard compound) in ethereal solution with magnesium. For the purpose of our invention, the ethereal solution obtained may be used directly, or the Grignard compound may be isolated in the usual manner. The reaction of forming our new products may be carried out by causing the two components to react upon each other either directly or in a suitable solvent such as ether or pyridine. In the beginning of the reaction cooling is often necessary. After the brisk reaction has finished the reaction mixture generally is heated on a water bath for some time, say about 1-2 hours to about 60–70° C. Then the reaction product is decomposed by pouring on ice. The new compounds are advantageously isolated by acidifying the aqueous solutions, extracting the same with ether, adding ammonia in excess to the remaining aqueous solutions and extracting the new bases from the ammoniacal solutions by extracting with ether.

Our new compounds generally are yellowish highly viscous oils, forming with acids well crystallizing salts which are soluble in water with a neutral reaction and are valuable pharmaceutical substances.

The invention is illustrated by the following examples but not restricted thereto:—

Example 1

An ethereal Grignard solution is produced from 14 grams of magnesium and 16 grams of bromobenzene. 10 grams of diethyl-amino-acetone are added to this drop by drop with cooling. After then heating for a short time the mass is poured on to ice, acidified and extracted with ether. It is then rendered alkaline by means of ammonia and the base of the formula

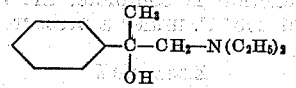

is extracted with ether. The base is obtained in excellent yield; it has a boiling point of 130° C. under a pressure of 13 mm.

Example 2

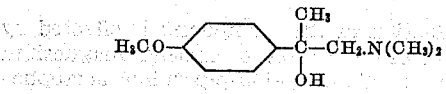

12 grams of magnesium and 50 grams of 4-bromoanisol are caused to react and 30 grams of dimethylaminoacetone are dropped in. On working up as described above, the base having a boiling point of 136° C. under a pressure of 27 mm. is obtained. The corresponding dimethylamino compound

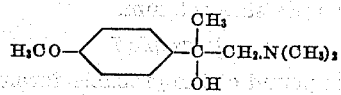

boils at 148° C. under 12 mm. pressure.

Example 3

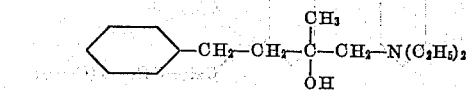

13 grams of magnesium and 54 grams of β-bromoethylbenzene form the magnesium compound, which is acted upon with 20 grams of diethylaminoacetone. The boiling point of the new base lies at 159° C. under 10 mm. pressure.

Example 4

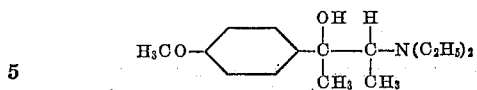

12 grams of magnesium and 60 grams of bromoanisol are caused to react in the customary manner and 22 grams of 3-diethylamino-2-butanone are dropped in. Heating is effected for some little while, until the reaction is complete, when the mass is poured on to ice, acidified, extracted with ether and rendered alkaline with ammonia. The base of the boiling point 174° C. under a pressure of 10 mm. is thus obtained.

Example 5

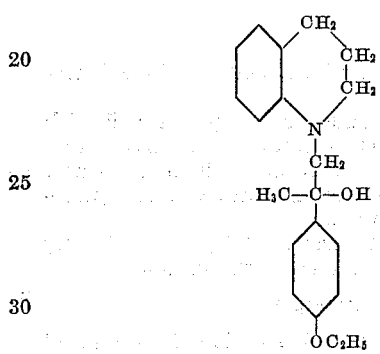

3-tetrahydroquinonyl-2-propanone, (obtainable by the action of tetrahydroquinoline on chloracetone, a liquid of the boiling point 173° C. under a pressure of 12 mm.) dissolved in ether, is added to an excess of the Grignard compound produced from 4-bromophenetol. When the energetic reaction is complete, the base of the boiling point 200° C. under a pressure of 10 mm. is obtained.

Example 6

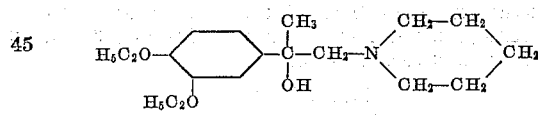

The production of this compound is effected by the action of an excess of methyl magnesium iodide on 3:4-diethoxy-1-β-piperidine acetophenone. The latter is obtained by alkylating the reaction product of piperidine and chloro-acetopyrocatechol (i. e., β-piperidine acetopyrocatechol) in alkaline solution by means of toluene sulphonic acid ester. It boils at 177° C. under a pressure of 2 mm. The compound obtained by reaction with the Grignard solution distils at 186° C., under a pressure of 3 mm.

Example 7

The compound of the probable formula:

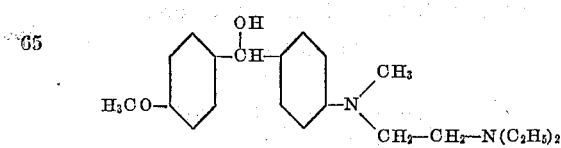

is obtained in the following manner: A Grignard compound is prepared from 18 grams of 4-bromoanisol and 3.4 grams of magnesium. When the reaction is complete, 11 grams of 4-N-diethyl-aminoethyl-methyl-aminobenzaldehyde (obtainable by reacting upon N-diethyl-p-amino-benzaldehyde with diethyl-amino-ethyl-chloride)

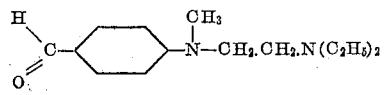

are caused to react upon the Grignard compound in ether. After heating, the resulting product is decomposed carefully by means of water and hydrochloric acid and extracted with ether. The extracted aqueous solution is rendered alkaline and the base taken up with ether. The base boils at 240° C. at a pressure of 2 mm. and yields in concentrated sulfuric acid a deep red "Halochromie" (See Berichte der Deutschen Chem. Ges. 35 (1902), p. 1190.)

Example 8

The compound of the probable formula:

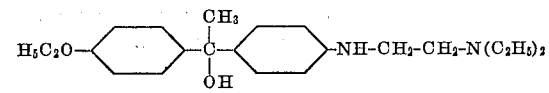

is obtained in the following manner: 50 grams of 4-diethylaminoethylaminoacetophenone (obtainable from 4-aminoacetophenone and diethyl-aminoethyl-chloride by heating in benzene, yellowish oil of the boiling point 171° C. under a pressure of 2 mm.) are added to an excess of magnesium bromophenetol. On working up the base, the first runnings are distilled off up to 170° C. and 2 mm. pressure and the residue is then recrystallized several times from alcohol. The base melts at 101° C. and yields when treated with concentrated sulfuric acid a deep red "Halochromie".

Example 9

The compound of the probable formula:

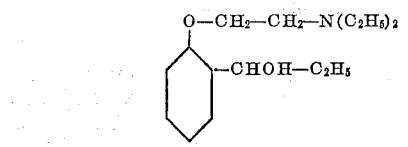

is obtained in the following manner: 10 grams of ethylbromide, 50 grams of ether and 3 grams of magnesium yield the Grignard compound, to which gradually is added 20 grams of the diethylaminoethylether of 2-hydroxy-benzaldehyde. After the customary working up, the new base distills at 142–145° C. at a pressure of 3 mm. as a colorless oil. The diethylaminoethylether of 2-hydroxybenzaldehyde employed is obtained as a yellow oil of a boiling point 152–155° C. under a pressure of 3 mm. by condensing diethylaminoethyl chloride with 2-hydroxy-benzaldehyde in the presence of alkaline media.

Example 10

The compound of the probable formula:

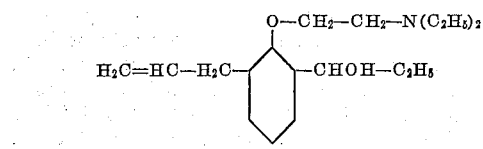

is obtained in the following manner: 2 parts of magnesium are dissolved in 50 parts of ether and 9 parts of ethyl bromide, 20 parts of the diethylaminoethylether of 3-allyl-2-hydroxybenzaldehyde are then added gradually and heating is advantageously effected for some time. The boiling point of the new base is 184–187° C. under 5 mm. pressure. Instead of the diethylamino-ethylene radical, present as basic radical in the above described compounds, other amino-alkylene radicals may be present.

*Example 11*

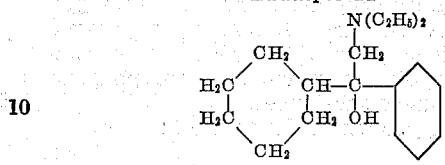

60 grams of cyclohexylbromide and 10 grams of magnesium are caused to react. 41 grams of ω-diethylaminoacetophenone in absolute ethereal solution are then dropped in and after the customary working up there is obtained the tertiary asymmetric amino alcohol, boiling at 186° C. under 13 mm. pressure.

*Example 12*

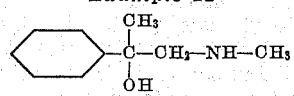

5 mols of methylmagnesium iodid and 1 mol of absolutely ω-methylamino-acetophenone (hydrochloric acid salt) are caused to act upon each other in ethereal solution. The reaction proceeds very briskly. Therefore cooling is necessary. When the brisk reaction has finished, the ether is evaporated and the reaction is completely on the water bath. The free base is isolated as described in Example 1. It has a boiling point of 144° C. under a pressure of 11 mm.

*Example 13*

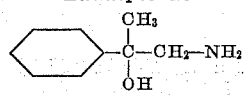

4 mols of phenylmagnesium-bromide, dissolved in ether are slowly introduced into 10 mols of absolutely dry puridine while stirring and cooling. To the pulpy mass formed there is slowly introduced a pyridine solution of the hydrochloric acid salt of aminoacetone. When the brisk reaction has finished, the ether is evaporated on the water bath and the reaction is completed by heating for about 1-2 hours. The pyridine is distilled off with steam; then diluted hydrochloric acid is added, the hydrochloric acid solution is extracted with ether, rendered alkaline by the addition of ammonia in excess and from the ammoniacal solution the free base is extracted with ether. The new base has a boiling point of 124° C. under a pressure of 12 mm.

We claim:—

1. The compounds of the general formula:

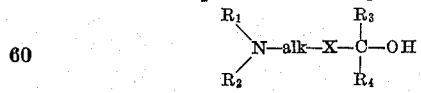

wherein $R_1$ and $R_2$ stand for substituents of the group consisting of hydrogen and lower alkyl, alk stands for a lower alkylene radical, X stands for an aromatic radical of the group consisting of —N(Z)—$C_6H_4$— (Z being hydrogen or a lower alkyl group) and —O—$C_6H_4$— (the nitrogen or oxygen atom being connected to the alkylene group), $R_3$ stands for a substituent of the group consisting of hydrogen and lower alkyl-, and $R_4$ stands for a substituent of the group consisting of lower alkyl-, phenyl and lower alkyl ethers of hydroxy phenyl radicals, being generally yellowish highly viscous oils, forming with acids well crystallizing salts which are soluble in water with a neutral reaction and being pharmaceutically valuable substances.

2. The compounds of the general formula:

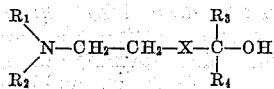

wherein $R_1$ and $R_2$ stand for substituents of the group consisting of hydrogen and lower alkyl, X stands for an aromatic radical of the group consisting of —N(Z)—$C_6H_4$—(Z being hydrogen or a lower alkyl group) and —O—$C_6H_4$—(the nitrogen or oxygen atom being connected to the ethylene group), $R_3$ stands for a substituent of the group consisting of hydrogen and lower alkyl, and $R_4$ stands for a substituent of the group consisting of lower alkyl-, phenyl and lower alkyl ethers of hydroxy phenyl groups, said products being generally yellowish, highly viscous oils, forming with acids well crystallizing salts which are soluble in water with a neutral reaction and are pharmaceutically valuable substances.

3. The compounds of the general formula:

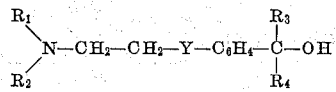

wherein each of $R_1$ and $R_2$ stands for hydrogen or a lower alkyl group, Y stands for a radical of the group consisting of —O—, and —N(Z)—(Z being hydrogen or a lower alkyl group), $R_3$ stands for a substituent of the group consisting of hydrogen and lower alkyl, phenyl and lower alkyl ethers of hydroxy phenyl, $R_4$ stands for a substituent of the group consisting of lower alkyl phenyl and lower alkyl ethers of hydroxy phenyl said products being generally yellowish, highly viscous oils, forming with acids well crystallizing salts which are soluble in water with a neutral reaction and are pharmaceutically valuable substances.

4. The compounds of the general formula:

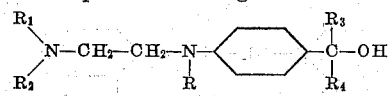

wherein each of $R_1$ and $R_2$ stands for hydrogen or a lower alkyl group, R stands for hydrogen or a lower alkyl group $R_3$ stands for a substituent of the group consisting of hydrogen and lower alkyl, and $R_4$ stands for a substituent of the group consisting of lower alkyl phenyl and lower alkyl ethers of hydroxy phenyl said products being generally yellowish, highly viscous oils, forming with acids well crystallizing salts which are soluble in water with a neutral reaction and are pharmaceutically valuable substances.

5. The compounds of the general formula:

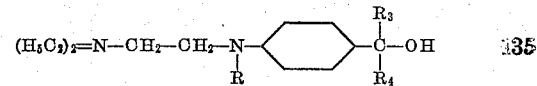

wherein R stands for hydrogen or lower alkyl, $R_3$ stands for a substituent of the group consisting of hydrogen and lower alkyl, and $R_4$ stands for a substituent of the group consisting of lower alkyl and lower alkyl ethers of hydroxy phenyl said products being generally yellowish, highly viscous oils, forming with acids well crystallizing salts which are soluble in water with a neutral reaction and are pharmaceutically valuable substances.

6. The compounds of the general formula:

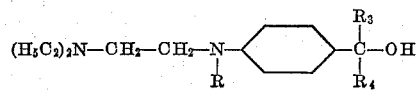

wherein R₃ stands for a lower alkyl group, R stands for hydrogen or lower alkyl, and R₄ stands for a substituent of the group consisting of lower alkyl, phenyl and lower alkyl ethers of hydroxy phenyl said products being generally yellowish, highly viscous oils, forming with acids well crystallizing salts which are soluble in water with neutral reaction and are pharmaceutically valuable substances.

7. The compounds of the general formula:

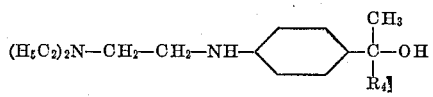

wherein R₄ stands for a substituent of the group consisting of lower alkyl and lower alkyl ethers of hydroxy phenyl, said products being generally yellowish, highly viscous oils, forming with acids well crystallizing salts which are soluble in water with a neutral reaction and are pharmaceutically valuable substances.

8. The compound of the formula:

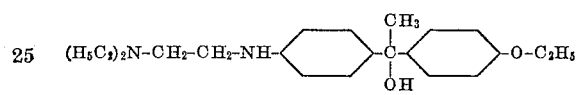

said product having a melting point of 101° C., forming with acid well crystallizing salts which are soluble in water with a neutral reaction, giving a deep red "Halochromie" with concentrated sulfuric acid and are a pharmaceutically valuable substance.

9. The compound of the formula:

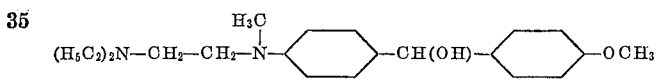

said product boiling at 240° C. under 2 mm. pressure, yielding in concentrated sulfuric acid a deep red "Halochromie".

10. The compounds of the general formula:

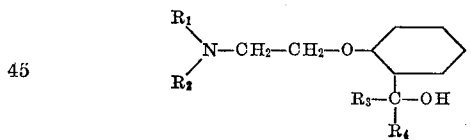

wherein each of R₁ and R₂ stands for a lower alkyl group the benzene nucleus may be further substituted by a lower alkenyl group, R₃ stands for hydrogen or lower alkyl and R₄ stands for lower alkyl, phenyl- or lower alkyl ethers of hydroxy phenyl, said products being generally yellowish, highly viscous oils, forming with acids well crystallizing salts which are soluble in water with a neutral reaction and are pharmaceutically valuable substances.

11. The compounds of the formula:

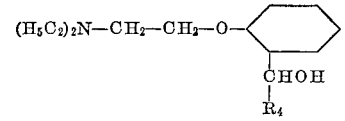

wherein the benzene nucleus may be further substituted by a lower alkenyl group and R₄ stands for lower alkyl, phenyl or lower alkyl ethers of hydroxy phenyl, said products being generally yellowish, highly viscous oils, forming with acids well crystallizing salts which are soluble in water with a neutral reaction and are pharmaceutically valuable substances.

12. The product of the formula:

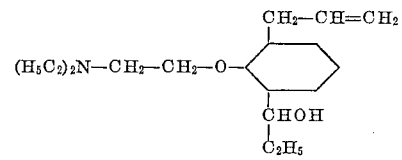

said product boiling at 184–187° C. at a pressure of 5 mm.

JOS. KLARER. [L. S.]
FRITZ MIETZSCH. [L. S.]
HANS HAHL. [L. S.]